Aug. 20, 1929.  W. H. SNOW  1,725,379
METHOD OF AND MACHINE FOR CUTTING GEARS
Filed Nov. 14, 1925  2 Sheets-Sheet 1

Wilbur H. Snow _____ INVENTOR

ATTORNEY

Aug. 20, 1929.  W. H. SNOW  1,725,379
METHOD OF AND MACHINE FOR CUTTING GEARS
Filed Nov. 14, 1925    2 Sheets-Sheet 2

Wilbur H. Snow INVENTOR

ATTORNEY

Patented Aug. 20, 1929.

1,725,379

UNITED STATES PATENT OFFICE.

WILBUR H. SNOW, OF ROCHESTER, NEW YORK, ASSIGNOR TO GLEASON WORKS, OF ROCHESTER, NEW YORK, A CORPORATION OF NEW YORK.

METHOD OF AND MACHINE FOR CUTTING GEARS.

Application filed November 14, 1925. Serial No. 69,016.

The present invention relates to a method of and a machine for producing curved tooth gears and particularly to a method of and machine for producing curved tooth gears in which the teeth are cut by a curvilinear cutting motion of the tool.

The present invention relates particularly to a method and machine in which a plurality of tools are moved, preferably with a reciprocating motion, in separate curved paths across the face of a gear blank, whereby two or more tooth faces of the blank may be cut in a single cutting operation. The primary object of this invention is, therefore, to provide a method of and machine for producing curved tooth gears which will be rapid and efficient in practise.

Where the tools employed in practising this invention are planing tools, the invention provides a method for producing curved tooth gears which will be not only rapid but will be very economical in tool costs.

A further feature of this invention is the provision of a method for simultaneously cutting the adjacent side faces of gears having teeth whose side surfaces are curved longitudinally on arcs of circles struck from different centers. In curved tooth gears of the type most generally employed today, at least one member of the pair, namely the pinion, has teeth of the character just described. In such processes as have been employed, heretofore, for producing these gears, two separate operations were required to complete a gear. One side face of all the teeth was cut first, then either the tool or blank had to be reset so that the adjacent side face might be cut. With the present invention, as will be more fully pointed out, hereinafter, it is possible to produce both adjacent side faces of such gears in a single cutting cycle and to complete the whole gear in one operation with one setting of the machine. The present invention provides therefore, a notable improvement in the art in expediting the production of gears such as described.

The present invention is capable of being practised in various ways and by means of various structures. For the purpose of illustration certain embodiments of the invention are disclosed in the drawing and described hereinafter. It will be understood, however, that while particular embodiments of the invention, relating both to method and machine, may be described, that the invention is capable of further modification within its scope and the limits of the appended claims.

In the preferred form of the present invention, two or more tools are reciprocated simultaneously in separate curved paths across the face of the gear blank being cut, to produce simultaneously two tooth faces on the blank. The tools may be positioned relatively to each other and relatively to the blank in various ways, and the invention is applicable to the production of various types of gears, both generated and non-generated.

In particular, the invention is applicable to the production of curved teeth on conical gear blanks, and it is with reference to the production of curved tooth bevel gears that the invention will be specifically described.

Figure 3:
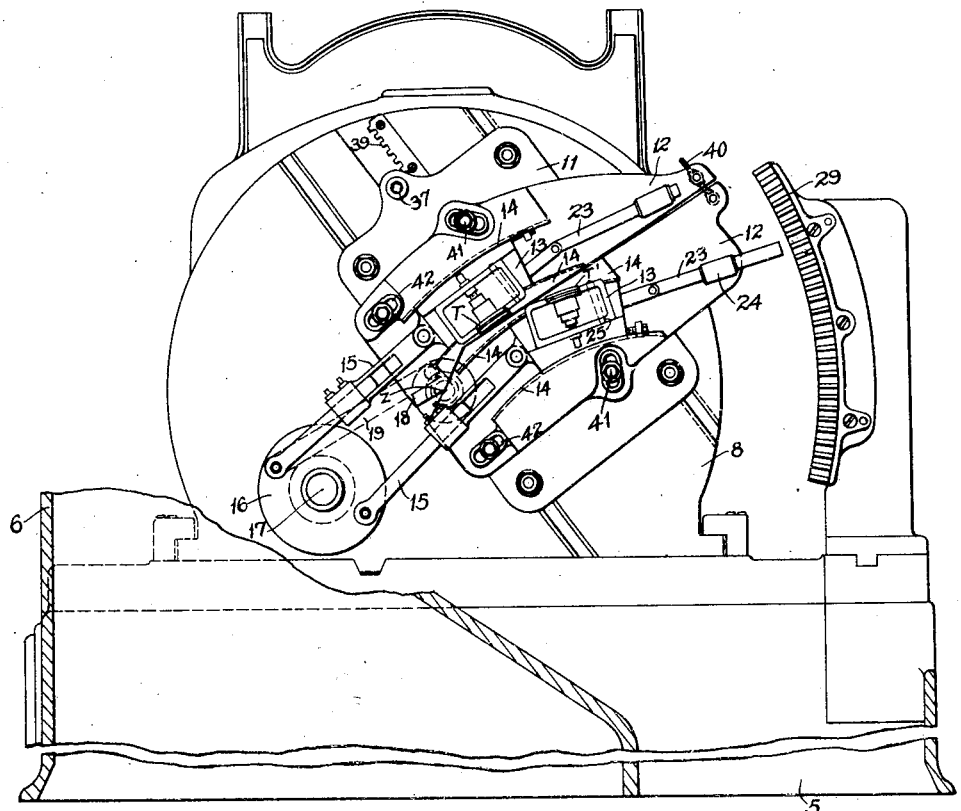
Fig. 3 is a front elevation of a machine constructed according to one embodiment of the invention.
Figure 1:
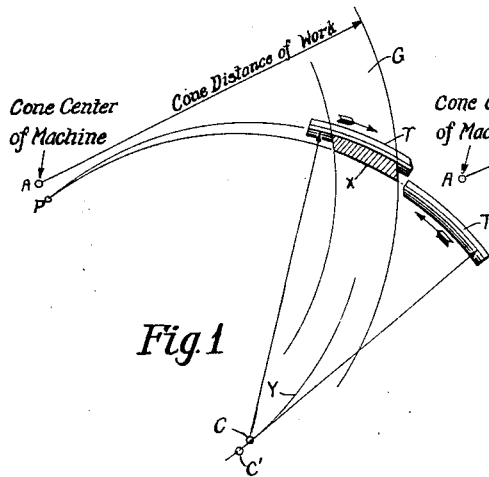
Figs. 1 and 2 illustrate, diagrammatically, two different ways of practising the invention.

In Fig. 1, a plane development of a bevel gear G is shown. The apex of this gear is indicated at A. According to my invention, the teeth of this gear will be cut by two or more, preferably, reciprocating tools, T and T' so actuated as to move in separate curved paths across the face of the blank and cut simultaneously adjacent side faces of a gear tooth or teeth. The centers about which the tools move can be located in any desired relation to the gear apex. If the tools are so positioned relatively to each other that the centers C and C' about which the tools move are located at different points, a tooth such as indicated at X will be cut upon the gear blank. This tooth will be of general crescent shape, as shown, with its sides converging to a point P located somewhere near the apex A of the blank. The centers C and C' about which the tools move will lie on a circle Y which lies in the plane of the developed gear. With the present invention, accordingly, it is possible to produce in one cutting operation, a gear provided with teeth having arcuate surfaces struck from different centers respectively. In practising the invention in the manner disclosed in Fig. 1, the radii of the circles struck about the centers C and C' may be equal or unequal, as desired. By so locating the centers of movement of the tools relative to the apex A of the blank as to change the position of the point P relative to such point A, gears of various spiral angles may be cut.

Figure 2:
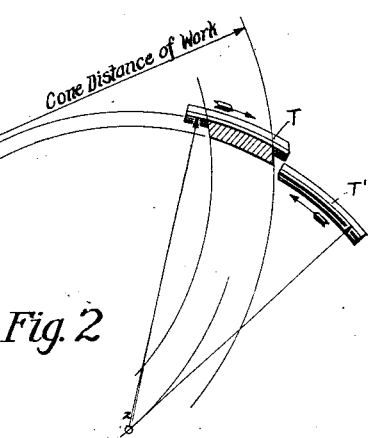
Figure 4:
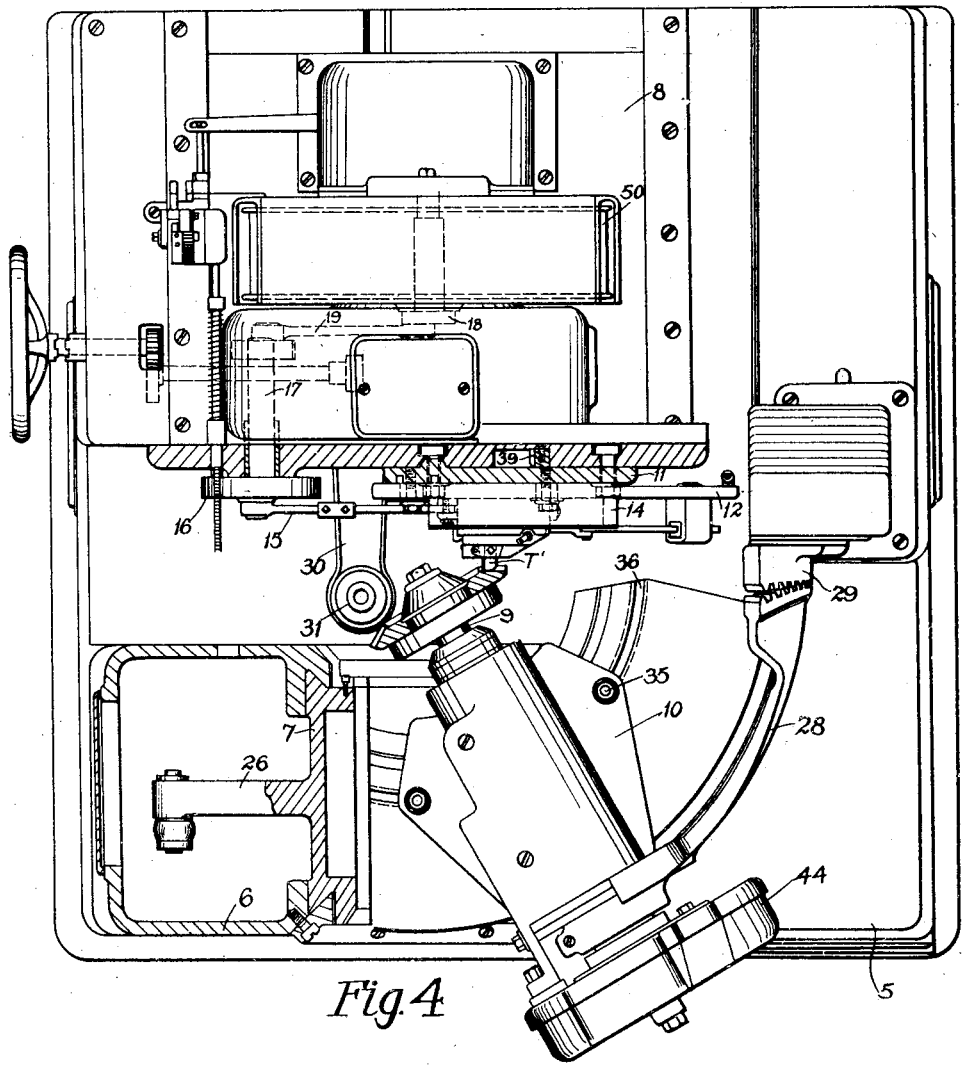
Fig. 4 is a plan view, partly in section, of this machine.
Figure 5:
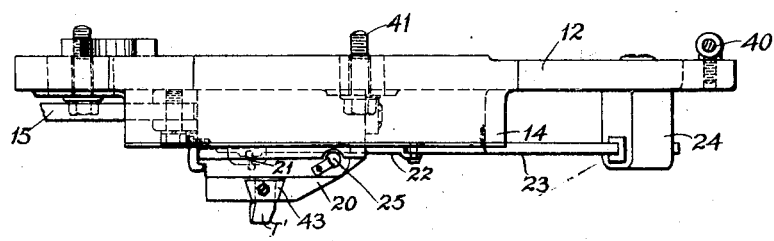
Fig. 5 is a plan view of the tool slide and tool mechanism employed on this machine.

A further embodiment of the invention is illustrated diagrammatically in Fig. 2 in which the reciprocating tools T and T' are so positioned as to move about the same center $C^2$. In this embodiment two adjacent side faces of the gear teeth will be produced simultaneously and these side surfaces will be curved on arcs of different radius struck from a common center. If tools are positioned relative to the blank so as to cut the root surface parallel to the pitch surface, and the gear is generated by a rolling motion as if in mesh with a true crown gear, the teeth will be of uniform depth and uniform width throughout, as shown. If the gears are cut with the root surface non-parallel to the pitch surface, or by a generating motion as of rolling on a conical surface, the tooth sides will converge.

In both Figs. 1 and 2, I have shown gears in which the tools cut adjacent sides of a tooth. It will be understood, however, that it is within the purview of this invention to position the tools so as to cut simultaneously the tooth sides bounding a groove.

One feature of this invention, true whether the tools produce a tooth or a groove in a cutting cycle, is the fact that the clearance angle of the tool or the angle between the side of the tool and the tooth face being cut will be constant throughout the length of the cut, as will be apparent from both Figs. 1 and 2, thus enabling the production of gears having teeth whose side faces have a very smooth finish.

The present invention may be practised with various forms of apparatus. A machine constructed for practising this invention will include a blank support, two or more tool supports, preferably reciprocable, and means for moving the tool supports so that the tools carried thereby will move in separate curved paths across the face of the gear blank being cut. One embodiment of a machine capable of practising the invention is illustrated in the accompanying drawings. It will be understood, however, that this invention is not limited to the particular embodiment shown, but is capable of being practised on other apparatus, so long as the basic features underlying the invention and pointed out particularly in the appended claims are retained.

The machine shown includes a frame or bed 5 provided with an upright portion 6 in which the blank carrier or cradle 7 oscillates. Slidably mounted on the frame or bed 5 is a support 8 carrying the tool mechanism. The blank itself is mounted on a spindle 9 which is journalled in the blank head 10 which is mounted for angular adjustment on the cradle 7.

During the cutting operation of the machine, the tools T and T' which are movably mounted on the tool support 8 are reciprocated in curved paths while a rotary movement is imparted to the blank spindle and while simultaneously the cradle 7 is oscillated in one direction about its axis. The rotation of the blank combines with the oscillatory motion of the cradle to produce the generated tooth profiles. After a tooth or space has been cut the tools and blank are relatively withdrawn, the blank indexed so as to present the next tooth or tooth space for cutting and the tools and blank are again moved into operative position.

The means for imparting to the tools their reciprocatory curvilinear motion will be first described. Slidably adjustable on the tool head or slide 8, is a plate 11 upon which are adjustably mounted a pair of tool guides 12. Reciprocably mounted in each of the tool guides 12 is a tool support 13. Each tool support carries one of the tools T or T'. The tool guides 12 are formed with curved guide portions 14 which serve to constrain and guide the tools in their movement thereon, whereby on actuation of the tools they are constrained to move in curved paths.

During the cutting operation a reciprocatory movement is imparted to each of the tools. The means for imparting this reciprocatory movement may be of any suitable character. As shown the tool supports 13 are each connected by an adjustable connecting rod 15 with an actuating member 16 which is secured to an oscillatable shaft 17 which is oscillated from the crank disc 18 by the connecting rod 19. The crank disc 18 may be driven from any suitable source of power in the machine illustrated, the pulley 50, actuated as more particularly described in the copending application of James E. Gleason et al. Serial No. 624,962, filed March 14, 1923. The tools may be so positioned on their supports 13 as to cut on either stroke of the connecting rods 15. On the return or idle stroke of the tools they are withdrawn from or clapped out of operating position. The means for clapping the tools may be of any suitable character. As shown each tool is mounted upon a clapper block 20 which is pivotally mounted on the tool support 13. Each clapper block is connected by a toggle member 21 with an arm 22 which has a swivel joint connection with a rod 23 which is slidable in a friction clamp 24, one of which is secured to each of the guide members 12.

The construction is such that on movement of the tool support 13 in one direction the clapper block 20 is swung on its pivot 25, through straightening out of the toggle member 21, to move the tool into cutting position while on movement of the tool support in the opposite direction the toggle member will be swung around to move the clapper block on its pivot and withdraw the tool from cutting position.

The means for imparting to the blank its rotary movement during the cutting operation may be of any suitable character. The mechanism shown is that more particularly described in the co-pending application of James E. Gleason et al., above referred to. This mechanism is actuated by the movement of the cradle 7, which may be oscillated about its axis by any suitable means, such for instance as that described in the application mentioned and comprising an arm 26 which is connected by an arm 27 with a rotary cam, not shown, which imparts to the arm 26 and cradle the desired motion. Oscillation of the cradle will impart a rotary motion to the blank spindle through the gear segment 28 which is connected to said spindle and which rolls on a stationary segment 29 which is secured to the frame or bed 5 of the machine.

After the completion of a tooth, as previously stated, the tool and blank are withdrawn relative to each other to permit of indexing the blank. The means for withdrawing one or other of these members from operative position to permit the indexing and for returning the member withdrawn to cutting position, after indexing, may be of any suitable character. As shown, this means comprises an arm 30 connected to the tool head 8 and carrying a roller 31, which, as described in the application above named, rides in the groove of a rotatable cam, so that periodically the tools will be withdrawn from engagement with the blank. After the relative withdrawal of tools and blank, the blank is indexed. The indexing mechanism may be of any suitable character such, for instance, as that described in the application already referred to and indicated generally at 44.

In setting up the machine for operation, the tool head 8 will be adjusted on the frame 5 to position the tools in proper cutting position. The blank head 10 may then be adjusted on the cradle 7 so as to position the blank into the proper cutting plane. When the blank has been positioned the head may be secured on the carrier by the bolts 35 which engage in the T-slots 36 on the carrier or cradle. The curvature of the guide portions 14 will determine whether the teeth to be cut on the blank are to be provided with adjacent arcuate surfaces struck from different centers or from a common center. By adjusting the plate 11 on the head 8, the center or centers about which the tools move may be adjusted relative to the apex of the blank to cut gears of different spiral angles. The adjustment of the plate 11 on the head may be effected in any desired manner. As shown, the adjustment may be effected manually by rotation of the shaft 37 to which is keyed a pinion which meshes with a rack 39 which is secured to the head 8. Any suitable means may be provided for adjusting the centers C and C', about which the tools move, relatively to each other, where the tools cut from different centers. To control the thickness of the teeth or groove, the guides 12 are so secured to the slide 11 as to be adjustable about a point Z lying in the line passing through the apex A of the gear blank. This relative adjustment of the guides 12 may be effected by rotation of the screw 40 which has a swivel connection with one of the guides and is threaded into a nut which is swivelly connected to the other guide. The guides may be secured in any adjusted position by bolts 41 which pass through arcuate slots 42 formed in the guides concentric with the point Z. The tools T and T', themselves, are mounted in blocks 43, which are adjustable in the clapper blocks 20 so as to vary the radial distances of such tools from the centers or center about which they swing. For cutting various sizes of gears, the connecting rods 15 are made adjustable so that the tools may be positioned to cut any desired distance from the cone apex of the blank. When the various adjustments of tool and blank have been made, the machine is ready for operation.

The machine shown will cut a gear of one hand. It is obvious that to cut a gear of opposite hand, the guides 14 would be of opposite curvature.

This invention provides a method and means for rapid production of curved tooth gears and one in which tool costs will be reduced to a minimum.

As previously stated, the invention is applicable to the production of all types of gears, whether generated or non-generated, and it is to be distinctly understood that it is not limited to the production of bevel gears but may be applied also to the manufacture of other types of gears as cylindrical, hypoid, etc. If a generating motion is employed, this motion may be of any desired character. It may consist in a relative movement of tool and blank, in the manner of a gear meshing with a basic rack, or crown gear, or other basic element, or it may comprise a relative movement of tool and blank in the manner of a gear meshing with its mate gear. It is obvious, of course, that this invention may be applied to the production of gears in either a roughing or finishing operation and that instead of a planing tool, a suitable grinding tool or other cutting member may be employed. The tools employed may be straight sided or of curved profile, and if curved the curvature may be of any suitable character, as involute, spherical, etc.

In general, it may be said, that while I have described my invention in connection with particular embodiments and in connection with specific uses for such embodiments, it it is to be understood that the invention is capable of various further modifications and uses without departing from the intent of the invention or the scope of the following claims and that this application is intended to cover any adaptations or embodiments, following in general, the principles of the invention and including such departures from the present disclosure as come within known or customary practice in the gear art and may be applied to the essential features herein before set forth and as fall within the scope of the invention or the limits of the appended claims.

Having thus described my invention, what I claim is:

1. The method of producing gears which consists in cutting one tooth face of a gear blank by a reciprocating tool which is oscillated about one center and simultaneously cutting an opposite side tooth face of the blank by a reciprocating tool which is oscillated about a separate center.

2. The method of producing longitudinally curved tooth gears which consists in cutting two side faces of a gear blank simultaneously by simultaneously reciprocating a pair of tools in separate curved paths across the face of a gear blank.

3. The method of producing longitudinally curved tooth gears which consists in cutting two side faces of a gear blank simultaneously by simultaneously reciprocating a pair of tools in separate curved paths across the face of the gear blank while simultaneously producing a relative rolling motion between the tools and blank to generate the tooth profiles.

4. The method of producing gears which consists in cutting two side surfaces of a gear blank simultaneously by reciprocating a plurality of tools across the face of a gear blank in paths curved with equal radii about different centers.

5. The method of producing gears which consists in cutting two side tooth surfaces of a gear blank simultaneously by reciprocating a plurality of tools across the face of a gear blank in paths curved with equal radii about different centers, and simultaneously imparting a relative rolling movement between tool and blank to generate the tooth profiles.

6. The method of producing curved tooth gears which consists in simultaneously oscillating a pair of tools about different centers to cause the same to cut simultaneously from different centers adjacent tooth faces of a gear blank, while simultaneously imparting a relative rolling movement between tools and blank to generate the tooth profiles.

7. The method of producing longitudinally curved tooth gears which consists in cutting two side faces of a gear blank simultaneously by simultaneously imparting an oscillatory motion to each of a pair of planing tools to simultaneously move the tools in separate curved paths across the face of a gear blank, and simultaneously producing a relative rolling motion between the tools and blank to generate the tooth profiles.

8. In a machine for producing curved tooth gears, a blank support, a frame, a plurality of longitudinally curved guides secured to said frame, a plurality of tools mounted for sliding movement in said guides, means for positioning the tools and blank support in operative relation, means for simultaneously reciprocating said tools in said guides and means for periodically indexing the blank.

9. In a machine for producing curved tooth gears, a blank support, a frame, a plurality of tool supports, slidable in curved guides on said frame, means for positioning the tool and blank supports in operative relation, means for reciprocating said tool supports in said guides and means for simultaneously imparting a relative rolling motion between tool and blank supports.

10. In a machine for producing curved tooth gears, a blank support, a frame, a plurality of tool supports movably mounted on said frame, a tool carried by each of said tool supports, means for positioning the tool and blank supports in operative relation, and means for simultaneously imparting to each of said tool supports an oscillatory movement to move the tools carried thereby in separate curved paths across the face of the gear blank to cut two adjacent tooth faces of the blank simultaneously.

11. In a machine for producing curved tooth gears, a blank support, a pair of tools for cutting opposite side tooth faces of the blank, means for positioning the tools and blank support in operative relation, means for simultaneously imparting to each of said tools a reciprocating motion in a curved path, while rolling the tools and blank support relatively to each other.

12. In a machine for producing curved tooth gears, a blank support, a pair of tools for cutting opposite side tooth faces of the blank, means for positioning the tools and blank support in operative relation, and means for oscillating said tools simultaneously in paths curved about different centers.

13. In a machine for producing gears, a blank support, a pair of tools for cutting opposite side tooth faces of the blank, means for positioning the tools and blank in operative relation, means for simultaneously oscillating the tools to move them in circular arcs across the face of the blank, and means for adjusting said tools to adjust the relative positions of the centers about which they move.

14. In a machine for producing gears, a blank support, a pair of tools for cutting opposite side tooth faces of the blank, means for positioning the tools and blank in operative relation, means for simultaneously oscillating the tools to move them in circular arcs across the face of the blank, means for adjusting said tools to adjust the relative positions of the centers about which they move and means for adjusting said tools radially of said centers.

15. In a machine for producing gears, a frame, a plurality of tool supports movably mounted on said frame, tools carried by said tool supports adapted to cut opposite side tooth faces of the blank, a blank support, means for positioning the tool and blank supports in operative relation, means constraining the movement of said tool supports so that the tools carried thereby move in curved paths across the face of the blank, and means for imparting to each of said tool supports a reciprocating movement, said means comprising an oscillatable actuating member and connecting rods connecting each of said tool supports to said oscillatable member.

16. In a machine for producing gears, a frame, a plurality of tool supports movably mounted on said frame, tools carried by said tool supports adapted to cut opposite side tooth faces of the blank, means for positioning the tool and blank supports in operative relation, means constraining the movement of said tool supports so that the tools carried thereby move in curved paths across the face of the blank, and means for imparting to each of said tool supports a reciprocatory movement, said means comprising a connecting rod connected to each of said tool supports and means for imparting to each of said connecting rods a reciprocatory movement.

17. In a machine for producing gears, a blank support, a pair of tools adapted to cut opposite tooth faces of the blank, means for positioning the tools and blank support in operative relation, means constraining said tools to move in curved paths across the face of the blank, means for imparting to each of said tools simultaneously a reciprocating movement, and means actuated on reciprocation of said tools to move the same to and from operating position.

18. In a machine for producing gears, a blank support, means for positioning said support in operative position, a frame, a plate slidably adjustable on said frame, a plurality of curved guiding members mounted on said plate and adjustable thereon about an axis intersecting the apex of the blank, a tool slide adjustably and reciprocably mounted in each of said guides and means for imparting to each of said tool slides a reciprocatory movement.

19. In a machine for producing gears, a blank support, a frame, a plurality of tool supports movably mounted on said frame, a curved guide secured to said frame for guiding one of said tool supports in its movement, means constraining the movement of the other tool support so that the tool carried thereby moves in a curved path, and means for imparting to each of said tool supports a reciprocatory movement.

20. In a machine for producing gears, a blank support, a plurality of reciprocating tools, means for positioning said tools and blank support in operative relation, means for guiding each of said tools in a curved path during its reciprocatory movement, an oscillatable actuating member, and means connecting said oscillatable member to each of said tools.

21. The method of producing gears which consists in simultaneously reciprocating a pair of tools which are adapted to cut opposite side tooth faces of the blank in separate curved paths across the face of a gear blank, while maintaining a constant angle of clearance between the sides of each of said tools and the side of the tooth being cut thereby.

22. In a machine for producing longitudinally curved tooth gears, a blank support, upon which a tapered gear blank is adapted to be mounted, a frame, a pair of guide members, provided with longitudinally curved guides, mounted on said frame, a tool support reciprocable in each of said guides, a pair of tools mounted on said tool supports adapted to cut opposite side tooth faces of the blank, means for simultaneously reciprocating said tool supports, and means for adjusting said guide members relatively to each other about an axis passing through the apex of the blank carried by said blank support.

23. In a machine for producing longitudinally curved tooth gears, a blank support upon which a tapered gear blank is adapted to be mounted, a frame, a plate adjustably mounted on said frame, a pair of guide members, provided with longitudinally curved guides, mounted on said plate, a tool support reciprocable in each of said guides, a pair of tools mounted on said tool supports adapted to cut opposite side tooth faces of the blank means for simultaneously reciprocating said tool supports, and means for adjusting said guide members relatively to each other about an axis passing through the apex of the blank carried by said blank support.

24. In a machine for producing longitudinally curved tooth gears, a blank support, a frame, a pair of tool supports mounted on the frame, a tool carried by each of said supports, means constraining the tool supports to move in separate curved paths, and means for simultaneously reciprocating each of said tool supports to cause the tools carried thereby to cut simultaneously different side tooth surfaces of a gear blank.

25. In a machine for producing longitudinally curved tooth gears, a blank support, a frame, a pair of tool supports mounted on the frame, a tool carried by each of said supports, means constraining said tool supports to move in separate curved paths, means for simultaneously reciprocating each of said tool supports to cause the tools to cut simultaneously different side tooth surfaces of a gear blank, and means for simultaneously producing a relative rolling motion between the tool and blank supports to generate the tooth profiles.

26. In a machine for producing longitudinally curved tooth gears, a blank support, a frame, a pair of tool supports oscillatably mounted on said frame, a tool carried by each of said supports, means for simultaneously oscillating said tool supports to cause the tools to cut simultanenously different side tooth surfaces of a gear blank along circular arcs.

27. In a machine for producing longitudinally curved tooth gears, a blank support, a frame, a pair of tool supports oscillatably mounted on said frame, a tool carried by each of said tool supports, means for simultaneously oscillating said tool supports to cause the tools carried thereby to cut simultaneously different side tooth surfaces of the blank along circular arcs, and means for simultaneously producing a relative rolling motion between the tool and blank supports to generate the tooth profiles.

28. In a machine for producing longitudinally curved tooth gears, a blank support, a frame, a pair of tool supports mounted on said frame, a tool carried by each of said supports, means constraining said tool supports to move in separate curved paths, means for simultaneously reciprocating each of said tool supports to cause the tools to cut simultaneously different side tooth surfaces of a gear blank, and means for adjusting the tool supports relatively to each other to adjust relatively to each other the paths through which the tool moves.

29. In a machine for producing longitudinally curved tooth gears, a blank support, a frame, a pair of tool supports oscillatably mounted on the frame, a tool carried by each of said supports, means for simultaneously oscillating said tool supports to cause the tools to cut simultaneously different side tooth surfaces of a gear blank along circular arcs, and means for adjusting the tool supports to vary the relative position of the axes about which the tools oscillate.

30. In a machine for producing longitudinally curved tooth gears, a blank support, a frame, a pair of tools which are adapted, respectively, to cut opposite side tooth faces of the blank, mounted on the frame for reciprocation in longitudinally curved paths, means for reciprocating said tools and means for alternately bringing the tools into cutting position.

31. In a machine for producing longitudinally curved tooth gears, a blank support, a frame, a pair of tools which are adapted to cut, respectively, opposite side tooth faces of the blank, mounted on the frame for reciprocation in longitudinally curved paths about separate centers displaced from one another and situated upon a circle concentric of the apex of the gear to be cut, and means for reciprocating said tools.

32. In a machine for producing longitudinally curved tooth gears, a work head, a tool head, an oscillatable cradle upon which one of said heads is mounted, a work spindle journaled in the work head, a pair of tools adapted to cut opposite side tooth faces of the blank mounted on the tool head for reciprocation about separate centers situated upon a circle concentric of the axis of the cradle, means for oscillating the work spindle, means for oscillating the cradle, and means for reciprocating the tools.

WILBUR H. SNOW.